United States Patent [19]

Fanaritis et al.

[11] 4,406,128

[45] Sep. 27, 1983

[54] COMBINED CYCLE POWER PLANT WITH CIRCULATING FLUIDIZED BED HEAT TRANSFER

[75] Inventors: John P. Fanaritis; James S. Davis, both of Warren, Pa.

[73] Assignee: Struthers-Wells Corporation, Warren, Pa.

[21] Appl. No.: 320,878

[22] Filed: Nov. 13, 1981

[51] Int. Cl.³ .............................................. F01K 23/06
[52] U.S. Cl. ..................................... 60/655; 122/4 D
[58] Field of Search ..................... 60/655, 650, 682; 122/4 D

[56] References Cited

U.S. PATENT DOCUMENTS

| 4,116,005 | 9/1978 | Willyoung | 60/655 |
| 4,223,529 | 9/1980 | Willyoung | 60/39.18 |
| 4,355,601 | 10/1982 | Hattiangadi | 122/4 D |

FOREIGN PATENT DOCUMENTS

| 1322338 | 7/1973 | United Kingdom. |
| 1443298 | 7/1976 | United Kingdom. |
| 776420 | 6/1977 | United Kingdom. |
| 1482869 | 8/1977 | United Kingdom. |

Primary Examiner—Allen M. Ostrager
Attorney, Agent, or Firm—Buell, Blenko, Ziesenheim & Beck

[57] ABSTRACT

In a combined generating plant utilizing a fluidized bed combustor in which coal or other carbonaceous fuel is burned at substantially atmospheric pressure, an external heat transfer unit is provided through which a portion of the hot solids of the fluidized bed is circulated through tubular channels. Clean air from an air compressor is passed through the heat exchanger unit around the outside of the tubular channels, so receiving heat through them from the hot solids circulating therethrough, and is expanded in a gas turbine. The flow of hot solids through the tubular channels is controlled independently of the operation of the combustor so as to accomodate varying loads on the generating units. Steam for a other uses is generated by a conventional boiler and superheater in the combustor.

4 Claims, 2 Drawing Figures

COMBINED CYCLE POWER PLANT WITH CIRCULATING FLUIDIZED BED HEAT TRANSFER

This invention relates to a combined cycle or cogeneration plant utilizing a gas turbine for generating electric power. It is more particularly concerned with a heat transfer unit for such a plant wherein a carbonaceous fuel such as sulfur-bearing coal is burned in a non-pressurized fluidized bed combustor to provide heat energy for driving the gas turbine and generating steam.

BACKGROUND OF THE INVENTION

This invention relates to a novel air heater design wherein compressed clean air is raised to elevated temperatures by heat supplied from the circulating fluidized bed combustion system, with the heated air leaving the air heater being expanded in a conventional gas turbine to drive an electric generator or other device. The air heater may be incorporated with equal effectiveness into a combined cycle or a cogeneration system, or a combination of the two.

The basic thermodynamic advantages of utilizing gas turbines in either combined cycle or cogeneration systems to generate electricity over the conventional electric utility central station installations are well established, and widely reported in the literature. The expanded use of gas turbines in these highly efficient cycles, however, has been limited because of the inability of gas turbines to accept the lower grade and more readily available fuels such as coal, petroleum coke, lignite, asphaltic residuum, etc. The current shortages of natural gas and liquid hydrocarbon fuels and their rapidly escalating costs have placed increased emphasis on the use of our large reserves of indigenous solid fuels in the generation of energy.

The present emphasis on the use of lower cost and more readily available solid fuels has initiated concerted efforts to develop gas turbine combined cycle and cogeneration systems wherein the primary energy source can be provided by solid or low grade liquid fuels such as asphaltic residuum. One effect of this effort is the development of the pressurized fluidized bed combustion system in which the products of combustion from the fluidized bed are directly expanded in a gas turbine, after cleanup, to provide the motive power for the gas turbine. This design appears to have a number of disadvantages including the following:
1. The difficulty and cost of gas cleanup at the elevated temperatures involved.
2. The potential erosion on the turbine blades from the particulate matter which is not removed from the combustion gases.
3. Potential fouling of the turbine from the particulate matter carried by the combustion gases.
4. The relative high cost of a pressurized fluidized combustion system versus an atmospheric fluidized bed combustion system.

A different approach to the development of solid or low grade liquid fired gas turbine combined cycle or cogeneration systems is to heat clean compressed air by heat generated in a fluidized bed combustor, and expand the clean heated air in a gas turbine. This arrangement permits the use of an essentially atmospheric pressure fluidized bed combustion system, and removes the problems associated with potential turbine blade erosion and turbine fouling anticipated with the pressurized fluidized bed combustion designs where the products of combustion are directly expanded in the gas turbine. All previous designs of air heaters proposed for use in the clean compressed air cycle feature tubular air heaters with the clean compressed air flowing through various tube configurations and heat being applied on the outside of the tubes.

A combined cycle power plant with atmospheric fluidized bed combustor is disclosed in U.S. Pat. No. 4,116,005 and one with a pressurized bed fluidized combustor in U.S. Pat. No. 4,223,529.

It is an object of our invention to provide an improved combined cycle or cogeneration power plant utilizing a coal-fired unpressurized fluidized bed combustor which supplies clean indirectly heated air to the gas turbine. It is another object to provide such a plant which utilizes a heat transfer unit external to its combustor to heat clean air for its gas turbines. It is another object to provide such a plant with an external heat transfer unit which operates with a lower pressure drop than has previously been obtainable.

It is another object of the invention to provide a novel air heater design which will provide greater reliability and service life than the conventional design having air flowing through the tubes of the air heater.

It is still another object of the invention to provide a novel air heater design which will operate at lower metal temperatures for the same outlet air temperature than a conventional air heater design having air flowing through the tubes.

A further object of the invention is to provide a novel air heater design which has lower frictional resistance to the flow of air than a conventional air heater having the air flowing through the tubes under identical performance conditions.

A still further object of the invention is to provide a novel air heater design which is more compact and more economical than a conventional air heater having the air flowing through the tubes under identical performance conditions.

SUMMARY OF THE INVENTION

We provide in a combined cycle or cogeneration plant utilizing a fluidized bed combustor in which coal or other carbonaceous fuel is burned at substantially atmospheric pressure, and an external heat transfer unit through which a portion of the hot solids of the fluidized bed is circulated through tubular channels. Clean air from an air compressor is passed thorugh the heat exchanger unit around the outside of the tubular channels, so receiving heat through them from the hot solids circulating therethrough. The flow of hot solids through the tubular channels is controlled independently of the operation of the combustor so as to accommodate varying loads on the generating units. Steam for a steam turbine or other uses is generated by a conventional boiler and superheater in the combustor. Conventional waste heat recovery means are connected to the gas turbine exhaust.

The novel air heater offers the following advantages over the conventional air heater having the air flowing through the tubes:
1. By flowing across the tubes in cross-flow, higher air heat transfer film coefficients are developed at equal to, or lower frictional losses, than can be achieved with air flowing through the tubes. This results in significantly lower metal temperatures for the same air outlet temperature than can be attained in an air heater design having the air flowing through the tubes.

2. The novel air heater design permits the use of extended surface on the outside of the tubes to enhance heat transfer and thus further reduce metal temperatures and permit the use of a lower tubular length to achieve the overall required heat transfer as compared to a conventional air heater with the air flowing through the tubes.

3. The novel air heater results in a more compact and economical design than a conventional air heater having air flowing through the tubes.

4. The novel air heater provides a design which is more accessible and easier to repair than a conventional air heater with the air flowing through the tubes.

The novel air heater design features flow of the solids heating the air heater through the tubes of the air heater in either vertically upward or vertically downward flow. When the heating solids flow upwardly through the tubes of the air heater, the solids are fluidized by the correct quantity of fluidizing air or flue gases. Thus, each tube becomes an individual and separate circulating fluidized bed, heating the air flowing on the outside of the air.

BRIEF DESCRIPTION OF THE DRAWINGS

An embodiment of our invention presently preferred by us is illustrated in the attached drawings in which.

DETAILED DESCRIPTION OF THE INVENTION

Figure 1:
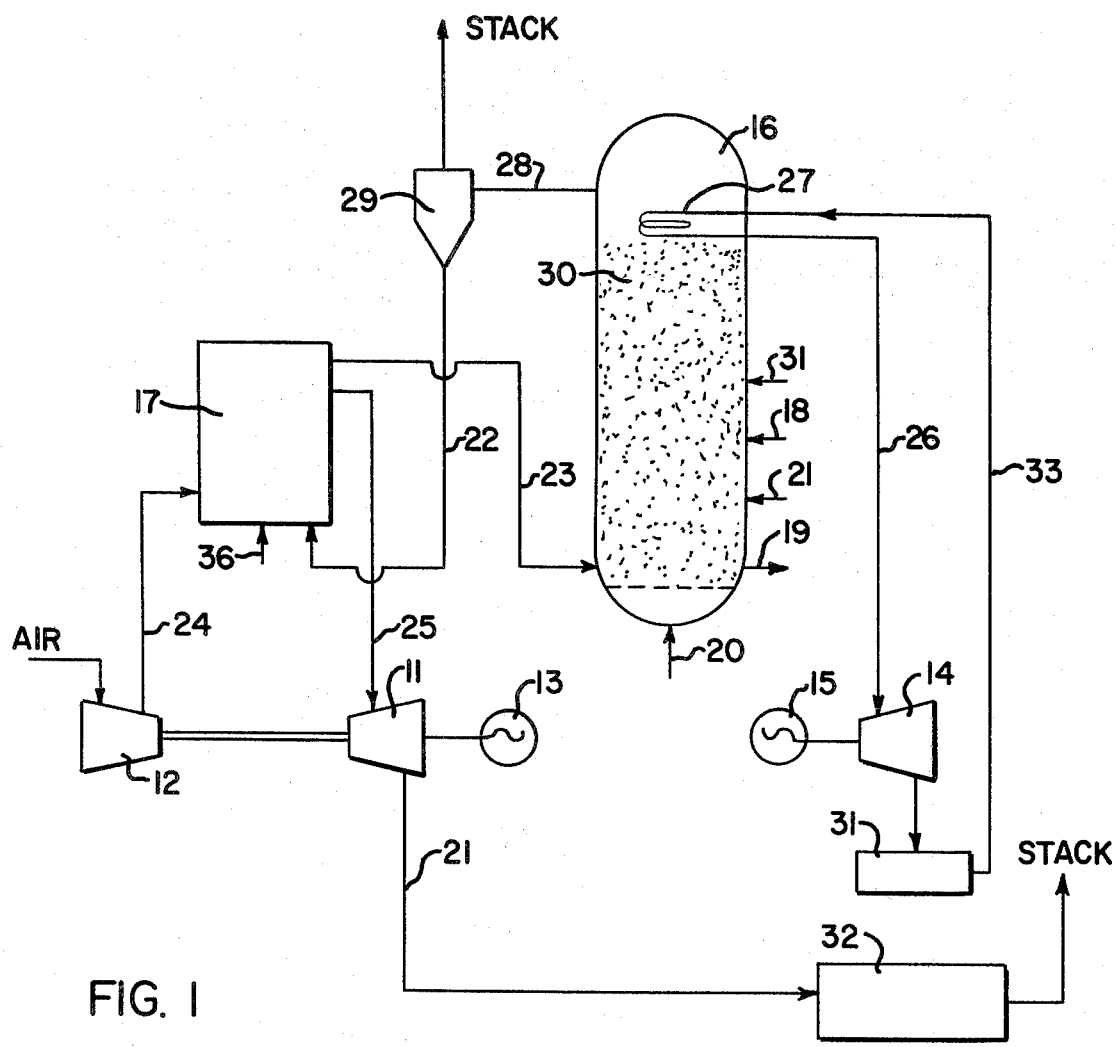
FIG. 1 is a block schematic of a combined cycle power plant according to our invention.

Our combined generating system comprises a gas turbine 11 which drives an air compressor 12 and a generator 13, a steam turbine 14 which drives a generator 15, a combustor 16 and an external heat transfer unit 17 connected therewith which provides heat energy for both turbines. Combustor 16 is charged with solid fuel through inlet 21 and with sulfur-absorbing particles through inlet 18. The solid fuel may be coal crushed in sizes up to 1½" or larger and the sulfur-absorbing particles may be limestone with a maximum feed size of −10 mesh or larger. A discharge port 19 is provided for removing spent sorbent. Fluidizing air is introduced into the bottom of combustor 16 through inlet 20 from any convenient source, establishing therein a fluidized bed of particles 30, typically sand, ash, limestone and calcium sulfate. Combustion air is introduced through inlet 31.

Fluidized solids from combustor 16 are conveyed to separator 29 through conduit 28. The clean gas from separator 29 is conducted to a stack. The separated solids are conveyed to heat transfer unit 17 through conduit 22, together with auxiliary fluidizing air through inlet 36, and are returned to combustor 16 through conduit 23. Clean air from air compressor 12 is introduced into heat transfer unit 17 through conduit 24, is heated therein by the fluidized solids in the way to be described hereinafter, and is conducted to gas turbine 11 through conduit 25. Steam is conducted to steam turbine 14 by conduit 26 from a conventional boiler and superheater 27 located either within combustor 16 or external thereof heated by spent combustion gas therefrom.

Exhaust steam from turbine 14 is passed into a condenser 31 and the condensate is returned to the boiler 27 in combustor 16 through conduit 33. The exhaust from gas turbine 11 is conducted to a stack through a flue 21 and waste heat recovery apparatus 32.

Figure 2:
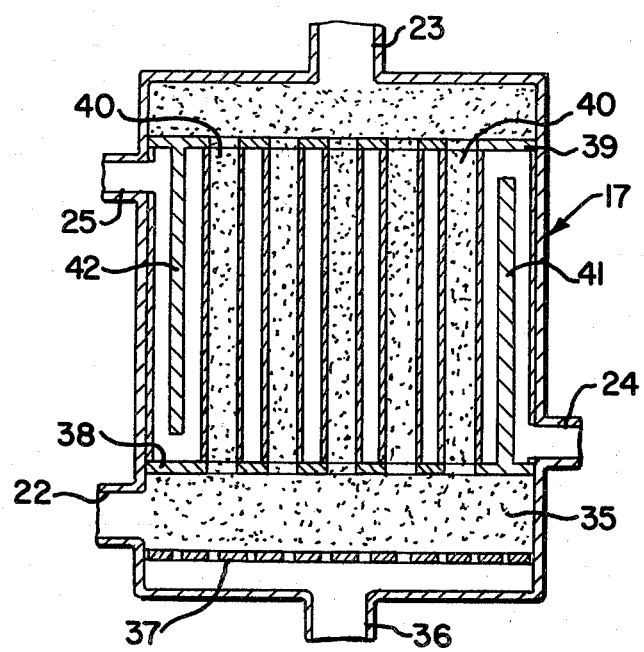
FIG. 2 is a vertical cross section through the external heat transfer unit of our invention.

FIG. 2 illustrates the structure of our heat transfer unit 17. Hot fluidized solids from combustor 16 are introduced into the bottom of unit 17 through conduit 22 in the sidewall of a lower subchamber 35. Auxiliary fluidizing air is introduced through the bottom of subchamber 35 through conduit 36. A perforated plate 37 is positioned in subchamber 35 above the opening of conduit 36 and extends the width of unit 17 to distribute the air flow from conduit 36 uniformly upwardly across the unit. A header plate 38 is positioned across the unit above perforated plate 37 and a second header plate 39 is positioned across unit 17 near its top. Parallel tubes 40 are fitted into holes in header plates 38 and 39 between them. A partition 41 extends vertically upwardly from header plate 38 but ends short of header plate 39 spaced from the outlet of air conduit 24 so as to form a baffle opposite that conduit end and a like partition 42 extends from header plate 39 vertically downwardly but ends short of header plate 38 to form a baffle opposite the end of conduit 25.

In operation the combustor 16 is charged with coal particles and sorbent particles of the sizes hereinbefore mentioned, the bed is fluidized by air introduced through conduit 20, which may be supplied from any convenient source, and the fuel is ignited. Some of the hot solids in the fluidized bed assisted by air through conduit 36 are circulated from combustor 16 through tubes 40 in air heater 17 and back into combustor 16. The hot solids are fluidized in the bottom of air heater 17 and flow upward through tubes 40. Air from compressor 12 passes into air heater 17 through conduit 24 around the outside surfaces of tubes 40, extracting heat therefrom, and out through conduit 25 to gas turbine 11 where it is expanded and rotates that turbine, generating electric power in generator 13 coupled thereto. The exhaust from turbine 11 is conveyed to conventional waste heat recovery apparatus 32.

Steam turbine 14 is fed by steam generated in coils 27 positioned within combustor 16 and expanded in that turbine, thereby producing power from electrical generator 15 coupled thereto. The exhaust from turbine 14 passes through a conventional condenser 31 and the condensed water therefrom is reheated in coils 27.

The air heater 17 has been described hereinabove as operating with upward flow of the solids through the tubes. It may also be operated with equal effectiveness with the solids flowing downward through the inside of the tubes under mildly fluidizing conditions which assure uniform distribution of the solids in the full inside diameter of each tube. Similarly, the outside of the air heater tubes 40 may be provided with extended surface to maximize the rate of heat transfer from the tubes of the air heater 10 to the clean compressed air.

As will be obvious from the description a circulating steam of solids transfers heat from the fluidized bed combustor 16 to the air heater 17, and then returns to the fluidized bed combustor 16 to be reheated. Heat in the fluidized bed combustor 16 is provided through the combustion of solid or low grade liquid fuels such as asphaltic residuum. This heat is transferred to compressed air in the air heater 10 which is then expanded in a gas turbine 16 to provide motive energy.

Our air heater provides a unique arrangement whereby the pressure drop is reduced for the same outlet temperature as compared to conventional designs because of improved air heat transfer film coefficients achieved by having the air flow across rather than through the tubes as is done in conventional designs. The fluidizing in the tubes of the circulating solids heating stream is also a unique feature of the invention in that it reduces erosion as compared with solids being fluidized outside of the tubes as is done in conventional designs.

The flow of fluidized hot solids through the tubes of our air heater may be controlled independently of the operations of the combustor, so as to accommodate varying loads on the generating units.

What is claimed is:

1. In a combined cycle power plant comprising a gas turbine portion including a compressor section and a turbine section, a steam utilizing portion, and a fluidized bed combustor for combustion of carbonaceous sulfur-bearing fuel particles at nearly atmospheric pressure in a bed of fluidized particles, steam generating means utilizing heat from the combustor and air heating means utilizing heat from the combustor, the improved air heating means comprising a chamber external of the combustor having tubes therein connected at one end with the combustor to receive said fluidized particles therefrom and at the other end with the combustor to return said fluidized particles thereto, a first duct connecting said chamber with the compressor section of the gas turbine to convey clean compressed air therefrom around the tubes in the chamber, and a second duct connecting the chamber with the turbine section of the gas turbine portion to convey that air heated by contact with those tubes to that turbine.

2. Apparatus of claim 1 including means for separating hot solid particles from combustion products leaving the combustor and introducing those separated particles into the tubes in the air heating means.

3. Apparatus of claim 1 in which the tubes in the air heating chamber are fitted at each end into partition walls in the chamber so as to form entry and exit subchambers therein for the fluidized particles and including means for introducing auxiliary fluidizing air into the entry subchamber.

4. Apparatus of claim 3 including means in the entry subchamber for distributing the fluidized air uniformly thereacross.

* * * * *